(12) United States Patent
Takeuchi et al.

(10) Patent No.: US 10,801,234 B2
(45) Date of Patent: Oct. 13, 2020

(54) VEHICLE TRUNK LOCKING DEVICE

(75) Inventors: Yoshiaki Takeuchi, Saitama (JP);
Katsuhisa Yamada, Saitama (JP);
Tsuguhito Ichiriki, Saitama (JP);
Hiroshi Nishijima, Saitama (JP);
Koichi Nozoe, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 138 days.

(21) Appl. No.: 12/585,549

(22) Filed: Sep. 17, 2009

(65) Prior Publication Data

US 2010/0077804 A1 Apr. 1, 2010

(30) Foreign Application Priority Data

Sep. 30, 2008 (JP) ................................ 2008-253373

(51) Int. Cl.
*E05B 41/00* (2006.01)
*G07C 9/00* (2020.01)
(Continued)

(52) U.S. Cl.
CPC ................ *E05B 41/00* (2013.01); *B62J 9/20* (2020.02); *B62K 19/46* (2013.01);
(Continued)

(58) Field of Classification Search
CPC .............. H04B 1/00; E05B 53/00; F05C 3/06
(Continued)

(56) References Cited

U.S. PATENT DOCUMENTS 4,688,036 A * 8/1987 Hirano et al. ................ 340/5.62
4,793,640 A * 12/1988 Stewart, Sr. ................... 292/201
(Continued)

FOREIGN PATENT DOCUMENTS

JP 2001-279976 10/2001
WO WO 2007003534 A1 * 1/2007

OTHER PUBLICATIONS

Canadian Office Action dated Jan. 11, 2012; Issued on corresponding Application No. 2,675,353.

*Primary Examiner* — Peter M. Cuomo
*Assistant Examiner* — Ifeolu A Adeboyejo
(74) *Attorney, Agent, or Firm* — Squire Patton Boggs (US) LLP

(57) ABSTRACT

A locking device for a trunk in a vehicle. The locking device includes a latch configured to change a state of the trunk between locked and unlocked, and a lever configured to drive the latch to an open position. The locking device further includes a lock knob configured to be disposed outward of a vehicle body to visually determine from an outside of the vehicle whether the trunk is in the locked state or the unlocked state. The lock knob is further configured to be selectively placed in a locked position. In the locked position, the trunk is configured to be brought into the locked state by prohibiting the latch from being driven to an open position. The lock knob is further configured to be selectively placed in an unlocked position. In the unlocked position, the trunk is configured to be brought into the unlocked state by enabling the latch to be driven to the open position. The locking device further includes an actuator for enabling the lock knob to be selectively placed in one of the locked position or the unlocked position. The locking device is configured to authenticate a portable key, when the lever is operated with the trunk in the locked state. When the portable key is authenticated, the lock knob is configured to be driven into the unlocked position.

13 Claims, 7 Drawing Sheets

(51) Int. Cl.
  *B62K 19/46* (2006.01)
  *B62J 9/20* (2020.01)
  *E05B 83/16* (2014.01)
  *E05B 81/06* (2014.01)
  *E05B 81/08* (2014.01)

(52) U.S. Cl.
  CPC .......... *G07C 9/00182* (2013.01); *E05B 81/06* (2013.01); *E05B 81/08* (2013.01); *E05B 83/16* (2013.01); *G07C 2009/00793* (2013.01); *G07C 2209/08* (2013.01); *Y10T 70/5004* (2015.04); *Y10T 70/5903* (2015.04); *Y10T 70/625* (2015.04)

(58) Field of Classification Search
  USPC ... 70/257, 233, 262–270, 278.7, 279.1, 292, 70/180
  See application file for complete search history.

(56) References Cited

U.S. PATENT DOCUMENTS

| | | | | |
|---|---|---|---|---|
| 4,887,064 A | * | 12/1989 | Drori et al. | 340/5.23 |
| 4,907,428 A | * | 3/1990 | Nakashima et al. | 70/264 |
| 5,049,867 A | * | 9/1991 | Stouffer | 340/426.17 |
| 5,351,509 A | * | 10/1994 | Visenzi | 70/73 |
| 5,654,688 A | * | 8/1997 | Allen et al. | 340/426.17 |
| 5,663,704 A | * | 9/1997 | Allen et al. | 340/426.25 |
| 5,929,769 A | * | 7/1999 | Garnault | B60R 25/2009 340/12.51 |
| 6,127,947 A | * | 10/2000 | Uchida et al. | 340/999 |
| 6,338,508 B1 | * | 1/2002 | Kleefeldt | E05B 81/06 292/201 |
| 6,485,081 B1 | * | 11/2002 | Bingle | B60Q 3/06 292/DIG. 43 |
| 6,549,130 B1 | * | 4/2003 | Joao | 340/539.14 |
| 7,126,453 B2 | * | 10/2006 | Sandau et al. | 340/5.61 |
| 7,196,612 B2 | * | 3/2007 | Sumada et al. | 340/5.72 |
| 2001/0028297 A1 | * | 10/2001 | Hara | B60R 25/246 340/5.62 |
| 2001/0030215 A1 | * | 10/2001 | Vincenzo | 224/435 |
| 2001/0030438 A1 | * | 10/2001 | Kamemizu et al. | 296/37.1 |
| 2002/0063623 A1 | * | 5/2002 | Juzswik | B60C 23/0408 340/442 |
| 2005/0288837 A1 | * | 12/2005 | Wiegand et al. | 701/36 |
| 2006/0197650 A1 | * | 9/2006 | Jones et al. | 340/5.61 |
| 2006/0255962 A1 | * | 11/2006 | Caren | 340/825.69 |
| 2007/0216175 A1 | * | 9/2007 | Tanimoto et al. | 292/336.3 |
| 2008/0024267 A1 | * | 1/2008 | Jones et al. | 340/5.1 |
| 2008/0173122 A1 | * | 7/2008 | Bagnariol | 74/478 |
| 2008/0309457 A1 | * | 12/2008 | Jones et al. | 340/5.62 |
| 2008/0314097 A1 | * | 12/2008 | Rohlfing et al. | 70/256 |
| 2009/0160211 A1 | * | 6/2009 | Krishnan et al. | 296/146.4 |
| 2009/0178449 A1 | * | 7/2009 | Raatikainen | 70/263 |
| 2009/0193859 A1 | * | 8/2009 | Kwon et al. | 70/91 |
| 2010/0064587 A1 | * | 3/2010 | Witte et al. | 49/358 |

* cited by examiner

VEHICLE TRUNK LOCKING DEVICE

BACKGROUND

Field

The present invention relates to a locking device for a trunk in a vehicle and, more particularly, to a vehicle trunk locking device that changes from a locked state to an unlocked state, or vice versa, by performing authentication with a portable key uniquely set for the vehicle.

Currently, a vehicle ignition key having a radio communication function is configured to lock and unlock a door or a trunk of a vehicle through radio communication without having to insert the key into a key hole disposed on a body side of the vehicle.

Patent Document 1, Japanese Patent Laid-Open No. 2001-279976, describes a motorcycle trunk having a locking device that changes from a locked state to an unlocked state, or vice versa, using a lock/unlock button on a portable key. The trunk includes a manually operated open lever, whereby, when the trunk is in the unlocked state, the open lever can be operated to open the trunk.

However, the arrangement described in Patent Document 1 has the following problem. The arrangement provides the rider of the vehicle no means of determining from the outside of the vehicle whether the trunk is in the locked or unlocked state. If, for example, it is necessary to recheck the locked state of the trunk as the rider leaves the vehicle, the rider must operate the open lever.

Japanese Patent Laid-Open No. Hei 9-21258 describes, as a solution to the foregoing problem of the prior art, a door lock device for a four-wheel vehicle. The door lock device includes an indicator having red and blue light-emitting diodes. The light-emitting diodes indicate a change to the locked or unlocked state. The door lock device, however, assumes radio wave transmission for changing from the locked state to the unlocked state, or vice versa, and does not consider other aspects as, for example, the ease of use during manual operation for changing from the locked state to the unlocked state, or vice versa.

Therefore, it is desirable to provide a locking device for a trunk of a vehicle, whereby the locking device enables a locked state or an unlocked state of a trunk to be determined from the outside of the vehicle. Furthermore, it is desirable for the locking device to include a lock knob that permits manual locking operation.

SUMMARY

In one embodiment, the invention includes a locking device for a trunk in a vehicle. The locking device includes a latch configured to change a state of the trunk between locked and unlocked, and a lever configured to drive the latch to an open position. The locking device further includes a lock knob configured to be disposed outward of a vehicle body to visually determine from an outside of the vehicle whether the trunk is in the locked state or the unlocked state. The lock knob is further configured to be selectively placed in a locked position. In the locked position, the trunk is configured to be brought into the locked state by prohibiting the latch from being driven to an open position, The lock knob is further configured to be selectively placed in an unlocked position. In the unlocked position, the trunk is configured to be brought into the unlocked state by enabling the latch to be driven to the open position. The locking device further includes an actuator for enabling the lock knob to be selectively placed in one of the locked position or the unlocked position. The locking device is configured to authenticate a portable key, when the lever is operated with the trunk in the locked state. When the portable key is authenticated, the lock knob is configured to be driven into the unlocked position.

In an embodiment, the invention includes a method for changing a state of a trunk from locked to unlocked by performing authentication of a portable key uniquely set for a vehicle. The method includes determining whether the trunk is in the locked state or the unlocked state. The method further includes performing the authentication of the portable key, using a locking device, when a lever is operated and the trunk is in the locked state. Further, the method includes unlocking the trunk, when the portable key is authenticated when the lever is operated, and maintaining the trunk in the locked state without the locking device being driven, when the portable key is not authenticated when the lever is operated.

In an embodiment, the invention includes a locking device for a trunk in a vehicle, the locking device includes latching means for changing a state of the trunk between locked and unlocked, and levering means for driving the latching means to an open position. The locking device further includes securing means disposed outward of a vehicle body to visually determine from an outside of the vehicle whether the trunk is in the locked state or the unlocked state. The securing means is for selectively placing the locking device in a locked position. In the locked position, the trunk is configured to be brought into the locked state by prohibiting the latch from being driven to an open position. The securing means is also for selectively placing the locking device in an unlocked position. In the unlocked position, the trunk is configured to be brought into the unlocked state by enabling the latch to be driven to the open position. The locking device further includes actuating means for selectively placing the securing means in one of the locked position or the unlocked position. The locking device is configured to authenticate a portable key, when the levering means is operated with the trunk in the locked state. When the portable key is authenticated, the securing means is for driving the locking device into the unlocked position.

DETAILED DESCRIPTION OF EMBODIMENTS

Embodiments to which the invention is applied will be described below with reference to the accompanying drawings.

Figure 1:
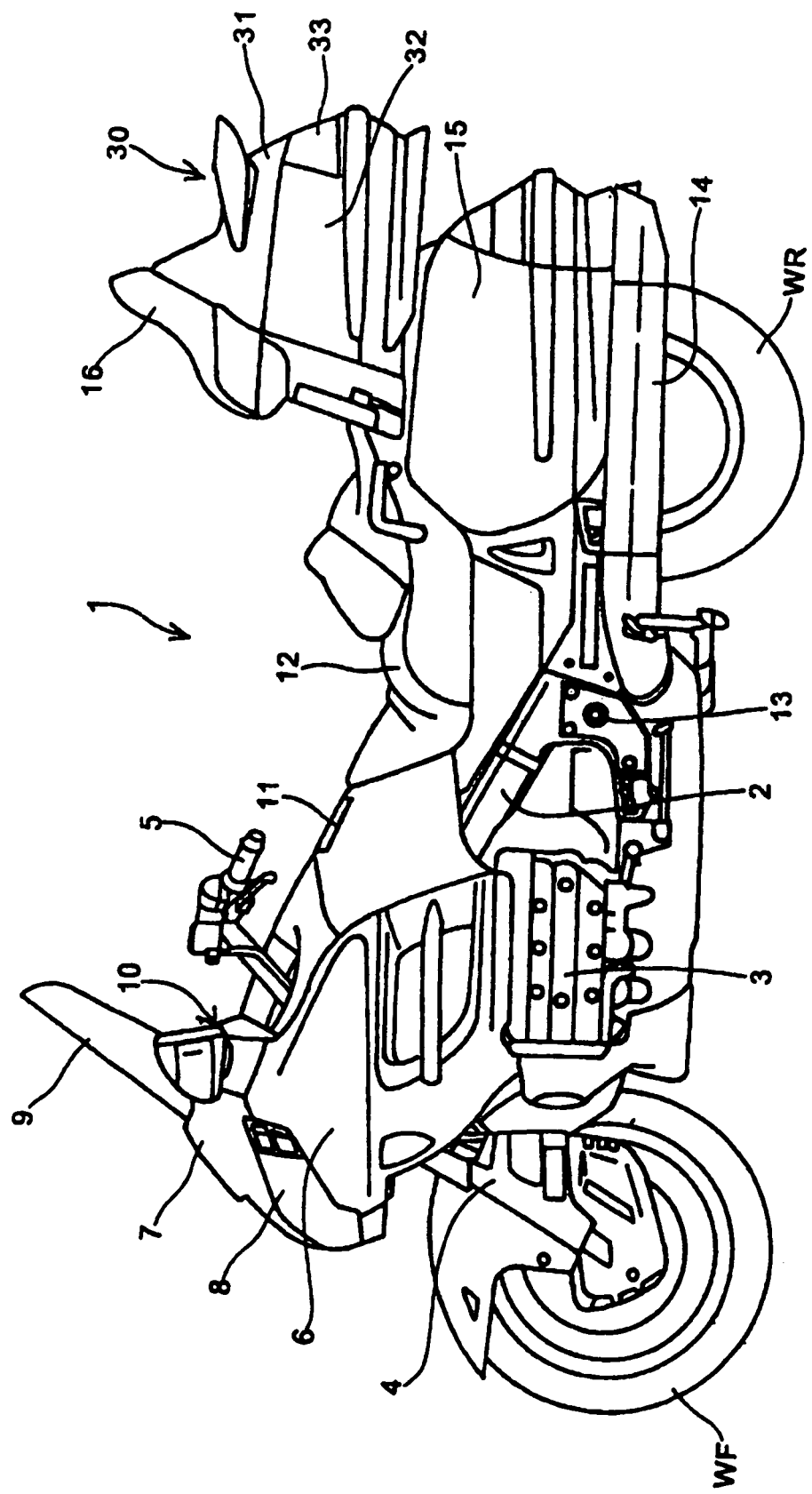
FIG. 1 is a side elevational view of a motorcycle including a trunk locking device, according to an embodiment of the invention.

FIG. 1 is a side elevational view of a motorcycle 1 including a trunk locking device, according to an embodiment of the invention. In this embodiment of the invention, the motorcycle 1, or a vehicle, includes a steering stem (not shown) that is rotatably journaled forward of a vehicle body frame 2. A steering handlebar 5 and a pair of left and right front forks 4 are fixed on upper and lower portions, respectively, of the steering stem. A front wheel WF is rotatably journaled on lower ends of the front forks 4. A drive source, for example, engine 3, is suspended below the vehicle body frame 2. A side cowl 6 covers an area above the engine 3. A left-right two-lamp headlight 8 is disposed forward of the side cowl 6. A front cowl 7 is disposed at an upper portion of the headlight 8. A meter unit 10 is disposed at a central portion of the vehicle body forward of the steering handlebar 5. A windscreen 9 formed, for example, from a transparent and colorless resin, is attached forward of and above the meter unit 10.

An openable lid 11 of a filler port is disposed at the center of the vehicle, in a vehicle width direction, rearward of the steering handlebar 5. A seat 12 is disposed rearward of the openable lid 11. A swing arm (not shown) that rotatably journals a rear wheel WR is vertically and swingably journaled on a pivot 13 at a rear end portion of the vehicle body frame 2. A pair of left and right mufflers 14 is mounted on outboard sides of the vehicle, in the vehicle width direction, of the swing arm. A pair of left and right saddle bags 15 is mounted on upper portions of the mufflers 14. A storage box, for example, a trunk 30, is mounted above the saddle bags 15 at the center of the vehicle, in the vehicle width direction. The trunk 30 includes an openable lid 31 disposed in an opening of a case 32. A pair of left and right taillight units 33 is disposed at a rear end portion of the case 32. A backrest 16 of a rear seat is disposed at a forward upper portion of the case 32.

Figure 2:
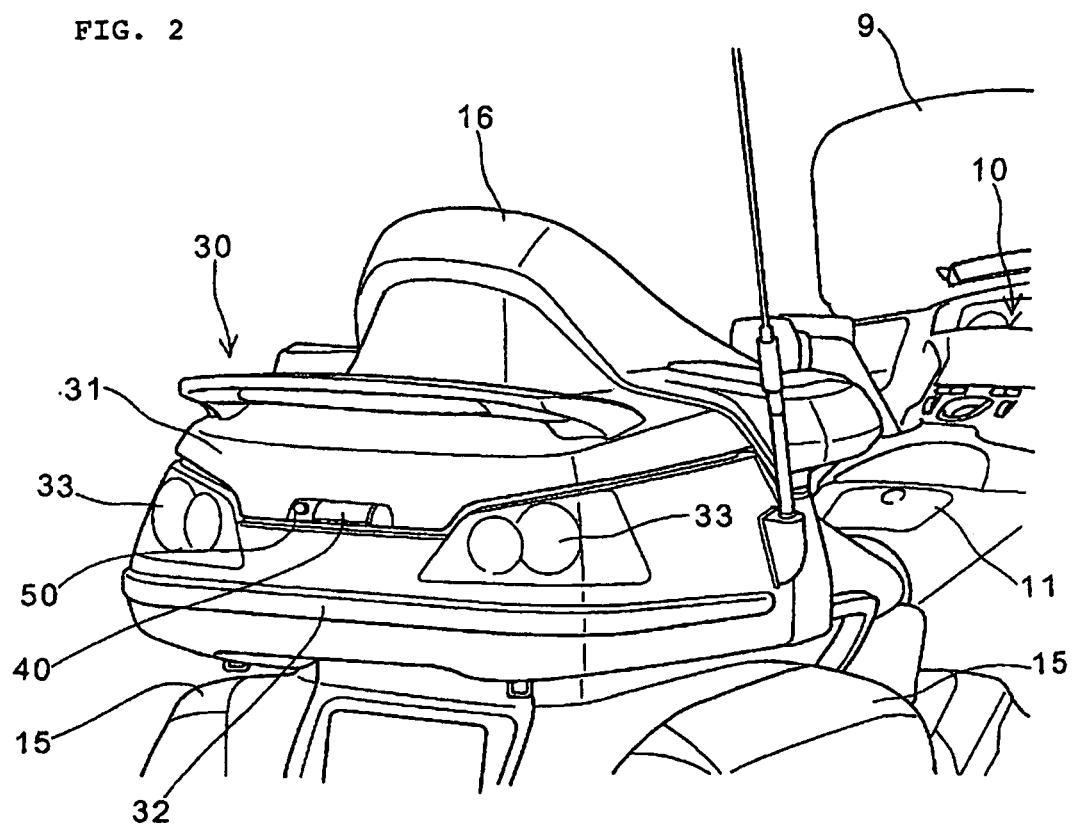
FIG. 2 is a partly enlarged view of the motorcycle with a closed trunk, according to an embodiment of the invention.
Figure 3:
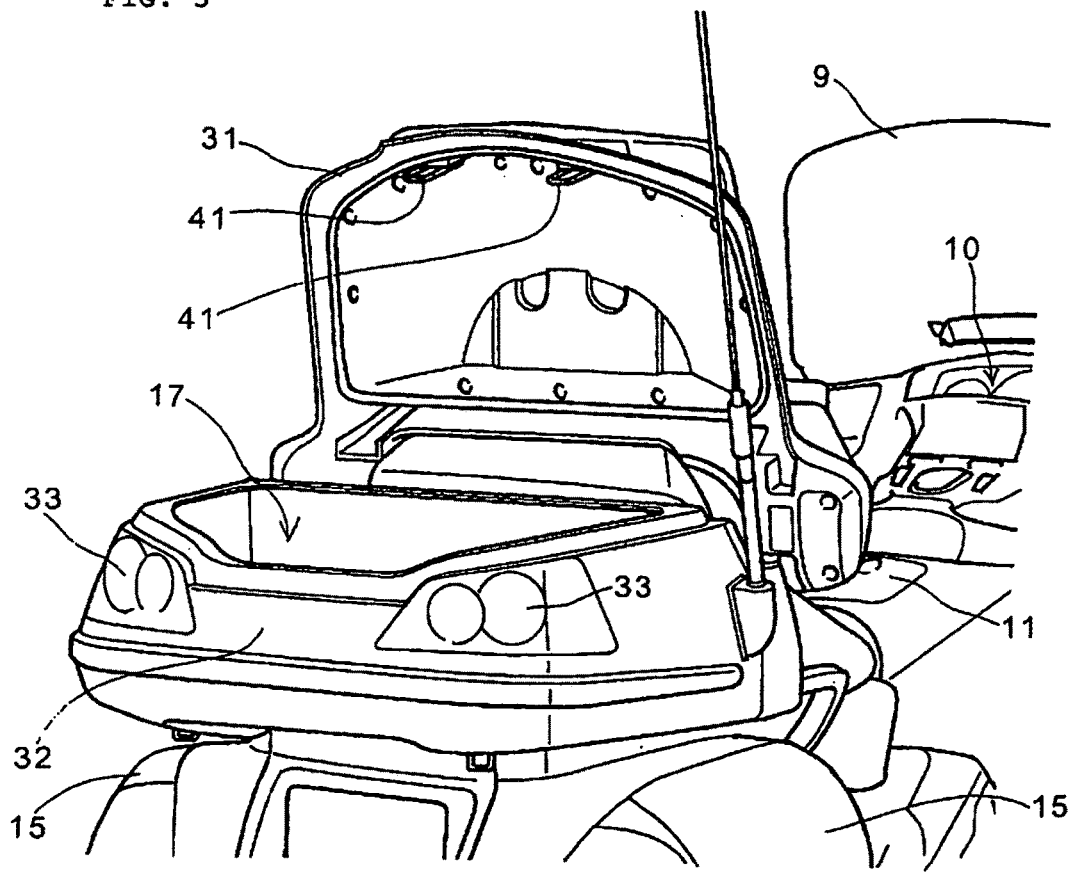
FIG. 3 is a partly enlarged view of the motorcycle with an open trunk, according to an embodiment of the invention.
Figure 4:
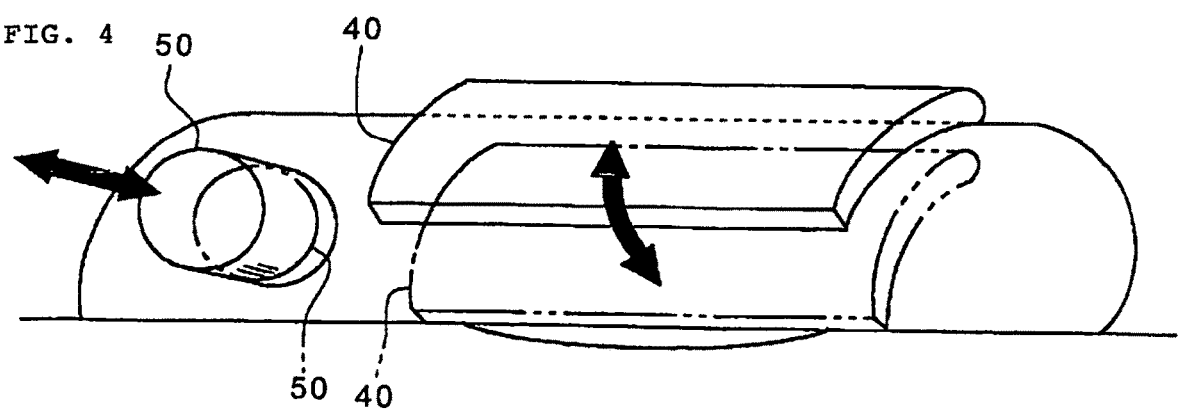
FIG. 4 is an enlarged view of an open lever and a lock knob of the trunk locking device, according to an embodiment of the invention.

FIGS. 2 and 3 are partly enlarged perspective views of the motorcycle 1. FIG. 2 is a partly enlarged view of the motorcycle with a closed trunk, according to an embodiment of the invention. FIG. 3 is a partly enlarged view of the motorcycle with an open trunk, according to an embodiment of the invention. Like parts are identified by the same reference numerals as those used in FIG. 1. In these embodiments of the invention, the trunk 30 includes a hinge (not shown) disposed at a front end portion of the case 32 used to openably journal the lid 31. Referring also to FIG. 4 of an enlarged view of a open lever and a lock knob of the trunk lock device, the lid 31 includes, for example, an open lever 40 and a button-type lock knob 50, both disposed outwardly of the vehicle body. In this embodiment of the invention, the open lever 40 drives an open/close latch 41. The lock knob 50 pops up or down based on a locked state or an unlocked state of the trunk 30.

When the open lever 40 is operated with the trunk 30 in a closed and unlocked state, the open/close latch 41 is driven to be disengaged from a hook (not shown) on a side of the case 32, so that the lid 31 is opened. When the state of the trunk 30 is locked, on the other hand, the open/close latch 41 is not driven even by operating the open lever 40, so that the lid 31 remains closed. Alternatively, when the lid 31 is to be closed, there is no need to use the open lever 40. Instead, the lid 31 can be closed by simply pressing an upper portion of the lid 31 in a downward direction, permitting the hook and the open/close latch 41 to engage with each other, thereby securing the trunk 30 in a closed and locked state.

The lock knob 50 can have, for example, a cylindrical shape and can be in an unlocked position (indicated by a solid line in FIG. 4), whereby the lock knob 50 protrudes from a mounting surface when the trunk 30 is in the unlocked state. When the trunk 30 is in the locked state, the lock knob 50 can be retracted into the mounting surface, whereby only a portion of the lock knob 50 is exposed (indicated by a dash-double-dot line in FIG. 4). This enables an occupant of the motorcycle 1 to determine whether the state of the trunk 30 is locked or unlocked by simply viewing the lock knob 50.

The lock knob 50 can also be configured to be placed in the locked position, whereby a round bottom operating face of the lock knob 50 is retracted to be flush with, or lower than, the mounting surface. This enables the lock knob 50, when in the unlocked position, to be depressed down into the locked position, preventing the occupant from inadvertently moving the lock knob 50 from the locked to the unlocked position.

The shapes and positions of the open lever 40 and the lock knob 50 are not limited to those described in the aforementioned embodiments of the invention and other shapes and positions are possible. For example, the open lever 40 and the lock knob 50 can be disposed, for example, on the side of the case 32, and the open/close latch can also, for example, be disposed on the side of the case 32. The open lever 40 and the lock knob 50 can still be disposed on a lower surface or a side surface of the case 32, or can be disposed at separate places spaced apart from each other.

Figure 5:
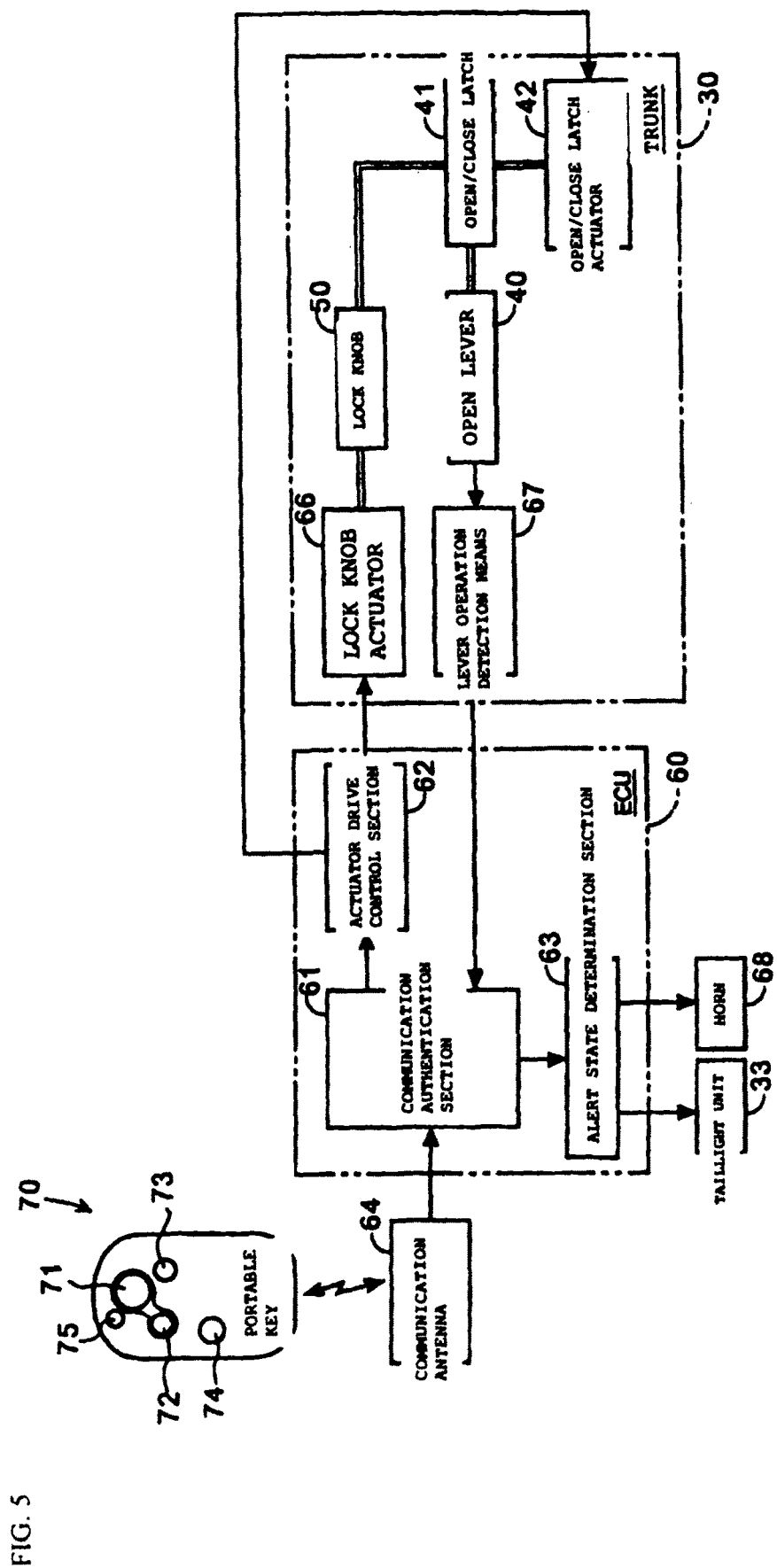
FIG. 5 is a block diagram of the trunk locking device and parts associated therewith, according to an embodiment of the invention.

FIG. 5 is a block diagram of the trunk locking device and parts associated therewith, according to an embodiment of the invention. Like parts are identified by the same reference numerals as those used in FIGS. 1 through 4. As previously described for other embodiments of the invention, the trunk 30 includes the open lever 40 for driving the open/close latch 41 and the lock knob 50 that prohibits driving of the open/close latch 41 when the state of the trunk 30 is locked. The trunk 30 also includes a lock knob actuator 66, an open/close latch actuator 42, and a lever operation detector 67. Specifically, in this embodiment of the invention, the lock knob actuator 66 drives the lock knob 50. The open/close latch actuator 42 drives the open/close latch 41. The lever operation detector 67 detects that the open lever 40 is operated. The lever operation detector 67 can be configured to include, for example, an ON-OFF type switch sensor that detects that the lever has moved out of an initial position.

Figure 10:
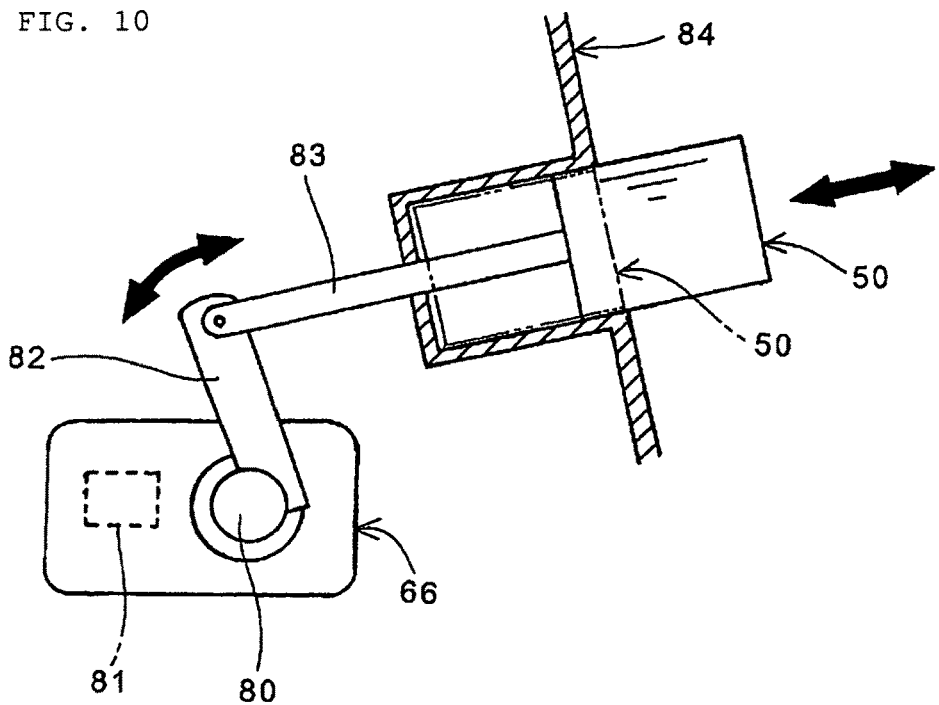
FIG. 10 is an enlarged perspective view of the open lever and the lock knob, according to an embodiment of the invention.

Referring to FIG. 10, a rocking arm 82 is mounted on a rocking shaft 80 of the lock knob actuator 66 that can include, for example, a solenoid or a motor. A driving rod 83 is connected to the rocking arm 82. The lock knob 50 is mounted on a leading end of the driving rod 83. According to the foregoing arrangements, driving the lock knob actuator 66 enables the lock knob 50 to be selectively placed in either the locked position or the unlocked position. When the lock knob 50 is in the unlocked position, in which the lock knob 50 protrudes from a mounting surface 84, the lock knob 50 can be depressed from the outside. Such a configuration enables the lock knob 50 to be depressed into the mounting surface 84 into the locked position (indicated by a dash-double-dot line in FIG. 10), while rotating the rocking shaft 80 in a counterclockwise direction as shown in FIG. 10. Note that an output signal from a position sensor 81, which detects that the lock knob 50 is in either the locked position or the unlocked position, is transmitted to a communication authentication section 61 to be described later.

Referring back to FIG. 5, the trunk 30, according to an embodiment of the invention, is configured to be locked, unlocked, or automatically opened by a portable key 70 carried by an occupant of the motorcycle 1. In this embodiment of the invention, the portable key 70 includes a power button 74 of the portable key 70, a light-emitting diode 75 for operation check, a lock button 71, an unlock button 72, and a pop-up (automatically open) button 73. The portable key 70 is set to offer a communicable range of a radius of, for example, less than 2 meters from the trunk 30.

An electronic control unit (ECU) 60 includes a communication authentication section 61, an actuator drive control section 62, and an alert state determination section 63. The actuator drive control section 62 applies a driving signal to each of the lock knob actuator 66 and the open/close latch actuator 42. The communication authentication section 61 performs authentication of the portable key 70 to determine whether the portable key 70 is a valid portable key of the motorcycle 1 based on a radio wave received via a communication antenna 64. Authentication can be terminated when the communication authentication section 61 determines that the portable key 70 is a valid portable key of the motorcycle 1. The alert state determination section 63 determines whether the occupant needs to be alerted, based on the result of authentication performed by the communication authentication section 61, about a condition of the lock knob 50.

The communication authentication section 61 performs authentication of the portable key 70 through, for example, collation of an encryption code contained in the received radio wave. The alert state determination section 63, when determining that an alert is necessary, can activate an alert unit that can include, for example, the taillight units 33 and a horn 68. Various other modified forms are possible for the alert unit, including, for example, a headlight, a flasher unit, a display of a navigation system, and a speaker of an audio system.

Figure 6:
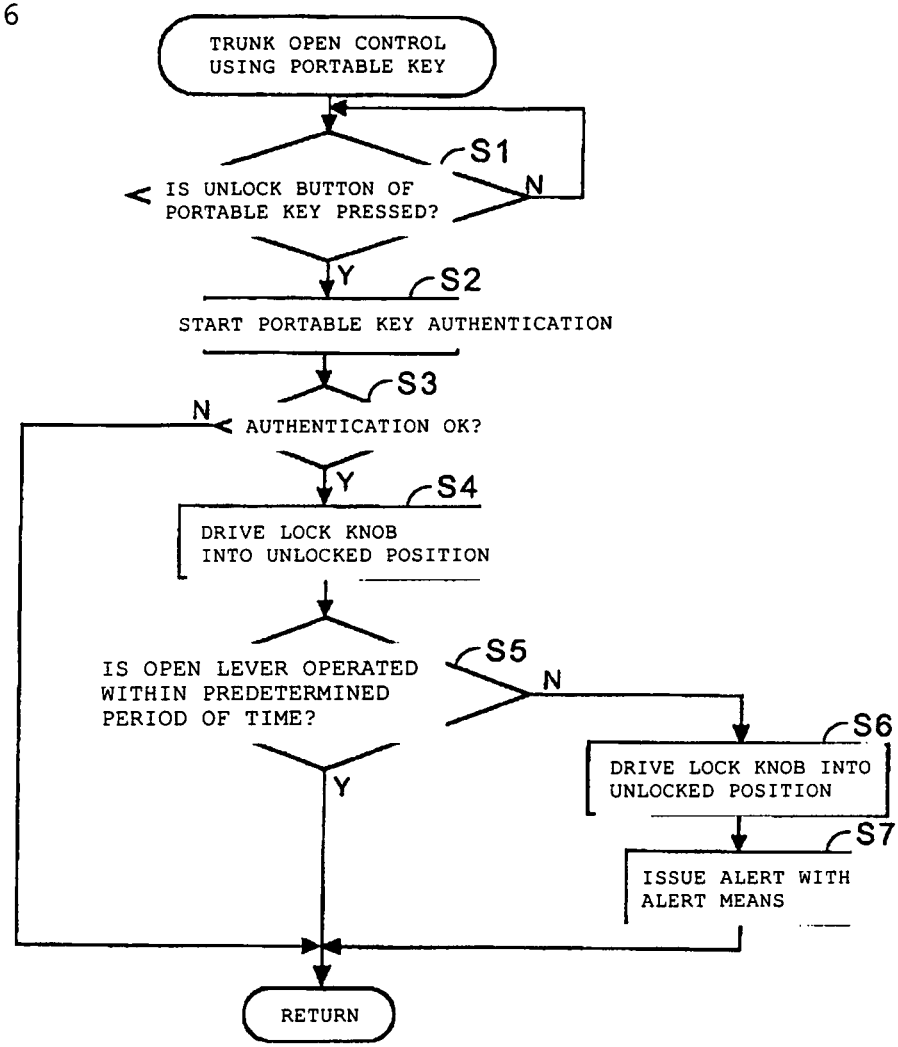
FIG. 6 is a flowchart diagram of control operations performed when the trunk is unlocked using a portable key, according to an embodiment of the invention.

Flow diagrams of control operations for locking and unlocking the trunk 30, according to other embodiments of the invention, will be described below with reference to FIGS. 6 through 9. FIG. 6 is a flowchart diagram of control operations performed when the trunk 30 is unlocked using a portable key 70, according to an embodiment of the invention. For example, in step S1, a determination is made whether the unlock button 72 of the portable key 70 is pressed. This determination is identical to that made by the communication authentication section 61 of the ECU 60 in determining whether a radio wave containing an unlock command has been received from the portable key 70. Step S2 is reached when, in step S1, the determination is made that the unlock button 72 of the portable key 70 has been pressed. In step S2, authentication of the portable key 70 is started. Note that the operation returns to step S1, when the determination is made, in step S1, that the unlock button 72 of the portable key has not been pressed.

In step S3, a determination is made whether the authentication is terminated. Step S4 is reached when, in step S3, the determination is made that the authentication has been terminated. As previously described, authentication can be terminated when the determination has been made that the portable key 70 is a valid portable key of the motorcycle 1. In step S4, the lock knob actuator 66 drives the lock knob 50 into the unlocked position. Note that the control operation is directly terminated when, in step S3, the determination has been made that the authentication is continued because the portable key 70 is not a valid portable key of the motorcycle 1. In step S5 that follows, a determination is made whether the open lever 40 is operated within a predetermined period of time after the lock knob 50 has been driven into the unlocked position. The series of control operations is terminated when, in step S5, the determination is made that the open lever 40 is operated within the predetermined period of time. The trunk 30 can then be opened by operating the open lever 40. A determination in step S5 is made based on, for example, output signals from a timer (not shown) included in the ECU 60 and the lever operation detector 67. Additionally, whether the state of the trunk 30 is closed state or open can be detected by, for example, an ON-OFF type switch sensor that is disposed at a joint surface between the lid 31 and the case 32, whereby the sensor is configured to detect that the lid 31 moves out of the closed position.

Step S6 is reached, when, on the other hand, in step S5, the determination is made that an operation of opening the trunk 30 is not performed within the predetermined period of time, despite the trunk 30 being unlocked using the portable key 70. In step S6, the lock knob actuator 66 returns the lock knob 50 into the locked position and, in step S7 that follows, an alert can be issued by the alert unit and the series of control operations is terminated.

In another embodiment of the invention, the trunk 30 can be opened using the open lever 40 after the trunk 30 is unlocked using the portable key 70. A situation can be prevented, whereby the occupant forgets that the trunk 30 was unlocked with the portable key 70, so that the state of the trunk 30 is maintained as unlocked without being opened. In addition, the occupant can be notified of the state of the lock knob 50 through an alert issued when the lock knob 50 is returned to the locked position.

Figure 7:
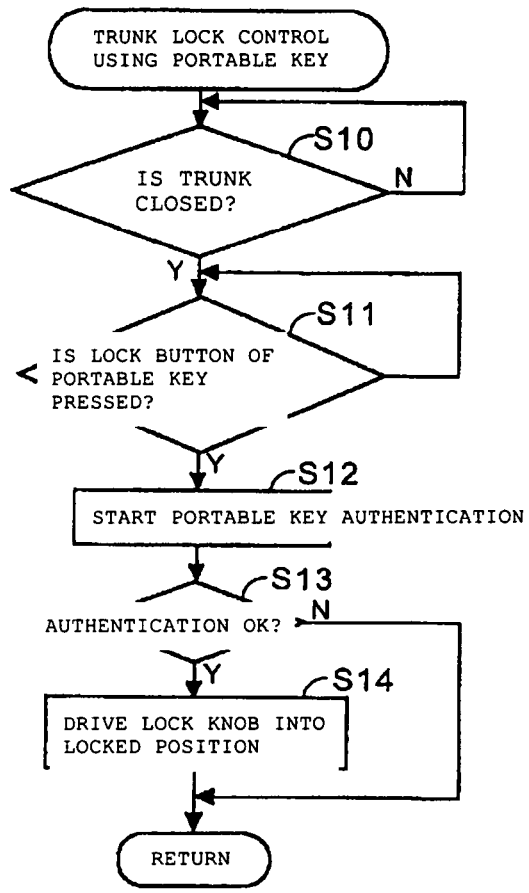
FIG. 7 is a flowchart diagram of control operations performed when the trunk is locked using the portable key, according to an embodiment of the invention.

FIG. 7 is a flowchart diagram of control operations performed when the trunk 30 is locked using the portable key 70, according to an embodiment of the invention. In step S10, a determination is made whether the trunk 30 is closed. Step S11 is reached when, in step S10, the determination is made that the trunk 30 is closed. In step S11, a determination is made whether the lock button 71 of the portable key 70 is pressed. Step S12 is reached when, in step S11, the determination is made that the lock button 71 of the portable key 70 has been pressed. Note that the operation returns to steps S10 and 11 when, in steps S10 and S11, the determination is made that the trunk 30 is not closed, or that the lock button 71 of the portable key 70 has not been pressed, respectively.

In step S12, authentication of the portable key 70 is started. In step S13 that follows, a determination is made whether the authentication is terminated. Step S14 is reached when, in step S13, the determination is made that the portable key 70 has been authenticated. As previously described, authentication can be terminated when the determination has been made that the portable key 70 is a valid portable key of the motorcycle 1. In step S14, the lock knob actuator 66 drives the lock knob 50 into the locked position, so that the state of the trunk 30 is changed to locked. Note that, when, in step S13, the determination is made that the portable key 70 is not a valid portable key for the motorcycle 1, it is determined that no normal lock signals are received from the portable key 70 and the series of control operations can be terminated with the lock knob 50 being kept in the unlocked position.

In accordance with the control operations during locking, as described above, the trunk 30 can be locked by pressing the lock button 71 of the portable key 70 after the trunk 30 is closed. At this time, the lock knob 50 is driven from the unlocked position to the locked position, viewing of which enables the locked state of the trunk 30 to be easily verified.

Figure 8:
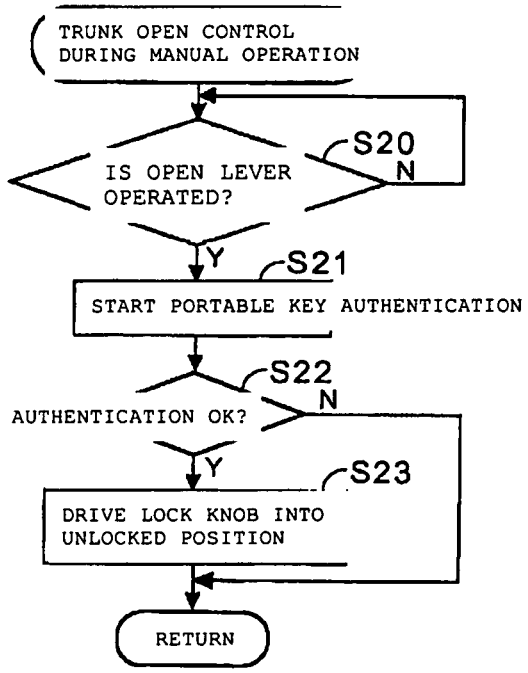
FIG. 8 is a flowchart diagram of control operations performed when the trunk is open through manual operation, according to an embodiment of the invention.

FIG. 8 is a flowchart diagram of control operations performed when the trunk 30 is open through manual operation, according to an embodiment of the invention. For example, in step S20, a determination is made whether the open lever 40 is operated. Step S21 is reached and authentication of the portable key 70 is started when, in step S20, the determination is made that the open lever 40 has been operated. Note that the operation returns to step S20, when, in step S20, the determination is made that the open lever 40 has not been operated. In step S22 that follows, a determination is made whether the authentication is terminated. Step S23 is reached when, in step S22, the determination is made that the authentication is terminated. As previously described, authentication can be terminated when the determination has been made that the portable key 70 is a valid portable key of the motorcycle 1. In step S23, the lock knob actuator 66 drives the lock knob 50 into the unlocked position and the series of control operations is terminated. The trunk 30 is now opened through the operation of the open lever 40. Note that the series of control operations is terminated with the lock knob 50 kept in the locked position, when, in step S22, the determination is made that the authentication is continued because an operator of the open lever 40 does not carry the portable key 70 with him or her.

In accordance with the control operations during manual opening as described above, an occupant who carries the portable key 70 with him or her can open the trunk 30 by simply operating the open lever 40 without touching the lock knob 50, thereby driving the lock knob 50 into the unlocked position.

Figure 9:
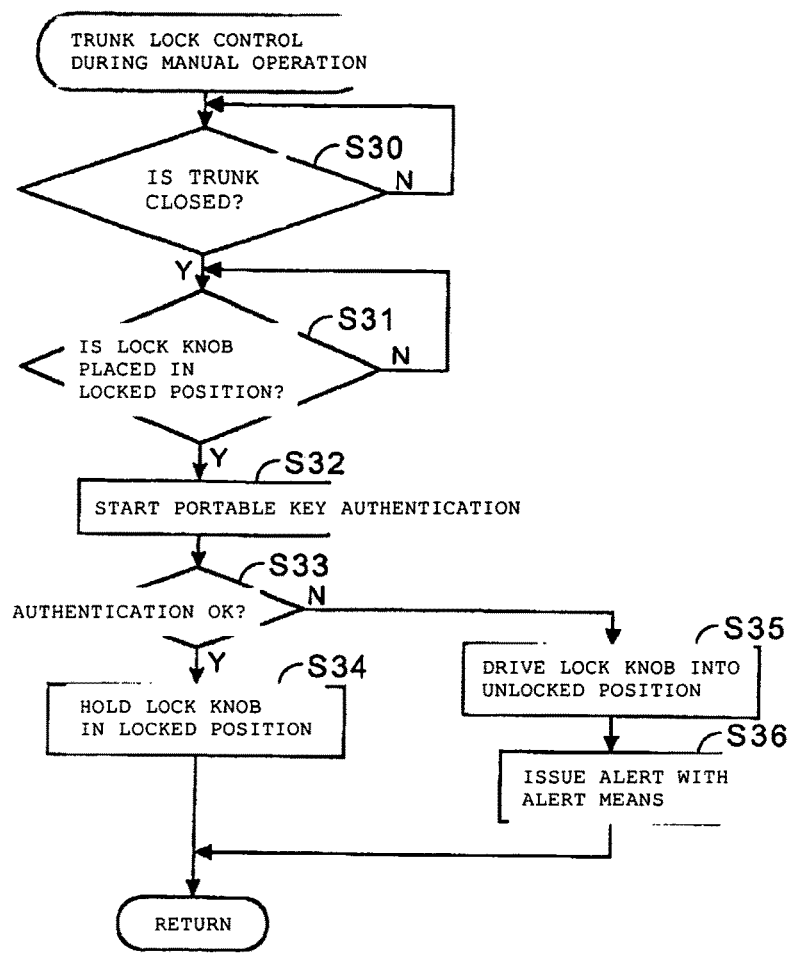
FIG. 9 is a flowchart diagram of control operations performed when the trunk is closed through manual operation, according to an embodiment of the invention.

FIG. 9 is a flowchart diagram of control operations performed when the trunk 30 is closed through manual operation, according to an embodiment of the invention. In step S30, a determination is made whether the trunk 30 is closed. Step S31 is reached when, in step S30, the determination is made that the trunk 30 is closed. In step S31, a determination is made whether the lock knob 50 is operated into the locked position. Step S32 is reached and authentication of the portable key 70 is started when, in step S31, the determination is made that the lock knob 50 has been operated into the locked position. Note that the operation returns to steps S30 and 31 when, in steps S30 and S31, that the trunk 30 is open or that the lock knob 50 has not been operated into the locked position, respectively.

In step S33, a determination is made whether the authentication is terminated. Step S34 is reached and the lock knob 50 is held in the locked position when, in step S33, the determination is made that the authentication has been terminated. As previously described, authentication can be terminated when the determination has been made that the portable key 70 is a valid portable key of the motorcycle 1. This completes the series of control operations. Note that, when, in step S33, the determination is made that the authentication is continued because an operator who does not carry the portable key 70 with him or her presses the lock knob 50, the operation proceeds to step S35. In step S35, the lock knob actuator 66 returns the lock knob 50 to the unlocked position and, in step S36, an alert is issued using the alert unit.

In accordance with the control operations during manual locking as described above, the occupant has only to depress the lock knob 50 downward to lock the trunk 30. As a result, the occupant easily realizes that he or she has performed the locking operation, so that frequency at which he or she reconfirms the locked state can be reduced. In addition, an alert issued when the lock knob 50 is returned to the unlocked position can warn an operator who does not carry the portable key 70 with him or her.

As described heretofore, the trunk locking device, according to an embodiment of the invention, includes the lock knob which is disposed at a position visible from the outside of the vehicle body when the trunk is in the closed position and the state of which changes between the locked position and the unlocked position. Such a configuration enables the locked state or the unlocked state of the trunk to be determined visually from the outside of the vehicle body. The trunk locking device, according to an embodiment of the invention, also includes the function to authenticate a portable key uniquely set for the vehicle and an actuator for driving the lock knob. If a fault occurs in authenticating the portable key when the lock knob is manually operated from the unlocked position to the locked position, the actuator is configured to return the lock knob to the unlocked position. This prevents any third person, who does not carry the portable key with him or her, from locking the trunk.

The structures and positions of the lock knob and the open lever, structures and configuration of actuators, sensors, and other parts, are not limited to those described in the embodiments of the invention described above; rather, various modifications are possible. For example, the alert issued using the alert unit can be changed to, for example, the number of blinks of a lighting apparatus or the period of time during which a horn sounds depending on the operation pattern during locking or unlocking. Further, in the embodiments of the invention described above, only the rear trunk disposed on the upper portion of the rear wheel is described. The arrangements described above for embodiments of the invention can be applicable to a saddle bag or other storage box. The trunk locking device, according to the embodiments of the invention, described above can, for example, be applied to a three-wheeled vehicle or a four-wheeled vehicle, in addition to the motorcycle.

DESCRIPTION OF REFERENCE NUMERALS

1 . . . Motorcycle (vehicle),
30 . . . Trunk
31 . . . Lid
32 . . . Case
33 . . . Taillight unit (alert unit)
40 . . . Open lever
41 . . . Open/close latch
42 . . . Open/close latch actuator
50 . . . Lock knob
60 . . . ECU
61 . . . Communication authentication section
62 . . . Actuator drive control section
63 . . . Alert state determination section
64 . . . Communication antenna
66 . . . Lock knob actuator
67 . . . Lever operation detector
68 . . . Horn (alert unit)
70 . . . Portable key
71 . . . Lock button
72 . . . Unlock button
73 . . . Pop-up button
84 . . . Mounting surface

We claim:
1. A trunk locking device in a vehicle, comprising:
a portable key; and
a trunk including
a case having an opening,
a lid configured to cover the opening,
a latch configured to engage the lid and the case,
a lever configured to remove an engagement between the lid and the case by the latch when the trunk is in an unlocked and closed state,
a lock knob movable between a locked position and an unlocked position, the lock knob configured to lock the trunk at the locked position, the lock knob configured to unlock the trunk at the unlocked position, and the lock knob configured to be flush or lower than a mounting surface of the trunk in the locked position, preventing the lock knob from being inadvertently moved from the locked position to the unlocked position,
a communication authentication section configured to authenticate the portable key via wireless communication, and
a lock knob actuator configured to move the lock knob from the locked position to the unlocked position when the trunk is in the locked state, the lever is operated, and the communication authentication section successfully authenticates the portable key.

2. The trunk locking device in the vehicle according to claim 1, wherein
the portable key includes an unlock button, and
the lock knob actuator is configured to move the lock knob from the locked position to the unlocked position when the trunk is in the locked state, the unlock button is operated, and the communication authentication section successfully authenticates the portable key.

3. The trunk locking device in the vehicle according to claim 1, wherein
the lock knob actuator is configured to move the lock knob from the unlocked position to the locked position when the lever is not operated within a predetermined time after the trunk is unlocked.

4. The trunk locking device in the vehicle according to claim 2, wherein
the lock knob actuator is configured to move the lock knob from the unlocked position to the locked position when the lever is not operated within a predetermined time after the trunk is unlocked.

5. The trunk locking device in the vehicle according to claim 3, further comprising:
an alert unit, and
an alert state determination section configured to determine whether the alert is necessary based on a result of authentication by the communication authentication section and the position of the lock knob, the alert state determination section configured to activate the alert unit when the lever is not operated within a predetermined time after the trunk is unlocked.

6. The trunk locking device in the vehicle according to claim 4, further comprising:
an alert unit, and
an alert state determination section configured to determine whether the alert is necessary based on a result of authentication by the communication authentication section and the position of the lock knob, the alert state determination section configured to activate the alert unit when the lever is not operated within a predetermined time after the trunk is unlocked.

7. The trunk locking device in the vehicle according to claim 1, wherein
the communication authentication section authenticates the portable key when the lock knob is operated from the unlocked position to the locked position,
the lock knob actuator is configured to hold the lock knob at the locked position when the communication authentication section successfully authenticates the portable key, and
the lock knob actuator is configured to move the lock knob to the unlocked position when the communication authentication section fails to authenticate the portable key.

8. The trunk locking device in the vehicle according to claim 2, wherein
the communication authentication section authenticates the portable key when the lock knob is operated from the unlocked position to the locked position,
the lock knob actuator is configured to hold the lock knob at the locked position when the communication authentication section successfully authenticates the portable key, and
the lock knob actuator is configured to move the lock knob to the unlocked position when the communication authentication section fails to authenticate the portable key.

9. The trunk locking device in the vehicle according to claim 7, further comprising:
an alert unit, and
an alert state determination section configured to determine whether the alert is necessary based on a result of authentication by the communication authentication section and the position of the lock knob, the alert state determination section configured to activate the alert unit when the communication authentication section fails to authenticate the portable key.

10. The trunk locking device in the vehicle according to claim 8, further comprising:
an alert unit, and
an alert state determination section configured to determine whether the alert is necessary based on a result of authentication by the communication authentication section and the position of the lock knob, the alert state determination section configured to activate the alert unit when the communication authentication section fails to authenticate the portable key.

11. The trunk locking device in the vehicle according to claim 1, wherein
the lock knob includes a button configured to protrude from a mounting surface at the unlocked position and configured to be retracted in the mounting surface at the locked position.

12. The trunk locking device in the vehicle according to claim 1, wherein
the vehicle is a motorcycle.

13. The trunk locking device in the vehicle according to claim 12, wherein
the trunk is disposed at an upper portion of a rear wheel of the motorcycle.

* * * * *